US006993772B2

(12) United States Patent
Pike et al.

(10) Patent No.: US 6,993,772 B2
(45) Date of Patent: Jan. 31, 2006

(54) COMMON COMMUNICATION SYSTEM FOR CONTROL INSTRUMENTS

(75) Inventors: Melissa J. Pike, Framingham, MA (US); Roy E. Lurie, Hopkinton, MA (US); Loren P. Dean, Hopedale, MA (US); Christian A. Portal, Holliston, MA (US); David J. DeAngelis, Waltham, MA (US); Darin S. Kalashian, Shrewsbury, MA (US)

(73) Assignee: The MathWorks, Inc., Natick, MA (US)

( * ) Notice: Subject to any disclaimer, the term of this patent is extended or adjusted under 35 U.S.C. 154(b) by 531 days.

(21) Appl. No.: 09/954,872

(22) Filed: Sep. 18, 2001

(65) Prior Publication Data

US 2003/0056018 A1   Mar. 20, 2003

(51) Int. Cl.
*G06F 13/10* (2006.01)

(52) U.S. Cl. ............................ 719/321; 710/62; 710/63

(58) Field of Classification Search ................ 719/310, 719/321–328; 710/62–63; 717/319
See application file for complete search history.

(56) References Cited

U.S. PATENT DOCUMENTS

| | | | | |
|---|---|---|---|---|
| 5,339,434 | A | * | 8/1994 | Rusis .......................... 709/246 |
| 5,627,998 | A | * | 5/1997 | Mondrik et al. ............... 710/62 |
| 5,671,345 | A | * | 9/1997 | Lhotak ........................ 345/620 |
| 5,740,801 | A | * | 4/1998 | Branson ...................... 600/407 |
| 5,764,546 | A | * | 6/1998 | Bryant et al. ................ 702/108 |
| 5,926,775 | A | * | 7/1999 | Brumley et al. ............. 702/127 |
| 6,067,584 | A | * | 5/2000 | Hayles et al. ................. 710/10 |
| 6,096,094 | A | * | 8/2000 | Kay et al. .................... 717/168 |
| 6,199,762 | B1 | * | 3/2001 | Hohle ......................... 235/492 |
| 6,202,147 | B1 | * | 3/2001 | Slaughter et al. ............... 713/1 |
| 6,345,315 | B1 | * | 2/2002 | Mishra ........................ 719/329 |
| 6,704,802 | B1 | * | 3/2004 | Finch et al. ................. 719/315 |
| 6,808,111 | B2 | * | 10/2004 | Kashef et al. ............... 235/380 |
| 6,862,735 | B1 | * | 3/2005 | Slaughter et al. ........... 719/315 |
| 2002/0087704 | A1 | * | 7/2002 | Chesnais et al. ............ 709/228 |
| 2002/0170039 | A1 | * | 11/2002 | Kovacevic .................. 717/138 |
| 2003/0165135 | A1 | * | 9/2003 | Itzkovitz et al. ............ 370/352 |

OTHER PUBLICATIONS

Instrument Control Toolbox for Use with MATLAB, User's Guide Version 1, The Math Works Inc., 2000, entire volume.
Hewlett Packard HP VISA (Version 1.1) User's Guide, Fifth Edition HP Standard Instrument Control Library User's Guide for Windows, 1998, entire volume.
Clyde F. Coombs, Jr., Electronic Instrument Handbook, 3$^{rd}$ Edition, McGraw & Hill, Chapters 42 and 43.
Software Interface Between MATLAB and a PC RS-232 Serial Port, NASA Tech Briefs, Apr. 2000, p. 44.
Talking to the HP 34970A in Java, IEEE Instrumentation & measurement Magazine, Sep. 1999, p. 54-56.

* cited by examiner

*Primary Examiner*—Lewis A. Bullock, Jr.
(74) *Attorney, Agent, or Firm*—Lahive & Cockfield, LLP (57) ABSTRACT

A communication system for linking users to control instruments. A user may send a first creation command from a user interface and establish a communication channel linking the command interpreter and the control instrument independent of the interface bus standard or interface hardware driver type. The communication system also includes providing a common communication interface between the user and the control instrument in an array-based programming environment. Embodiments provide a concise and powerful communication system for communicating with control instruments independent of the various types of supported interface bus standards, communication protocols, and driver types.

54 Claims, 5 Drawing Sheets

COMMON COMMUNICATION SYSTEM FOR CONTROL INSTRUMENTS

TECHNICAL FIELD

This invention relates to communication systems.

BACKGROUND

In typical instrumentation systems, a computer communicates with control instruments such as oscilloscopes and function generators that can obtain data about dynamic real-world systems under test. Users can model, simulate, or analyze data by establishing a communication channel to the control instruments. Users connect the computer to the control instruments through various interface options such as Serial, General Purpose Interface Bus (GPIB), or Virtual Machine Environment Extended for Instrumentation (VXI).

Users typically use a software driver having a distinct API provided by a manufacturer of an interface hardware to establish a communication channel with a particular control instrument. The software driver includes a library of executable functions that a computer program may call to establish the communication channel or to reconfigure the communication channel.

SUMMARY

According to one aspect of the invention, a method includes receiving a first creation command from a user interface and establishing a communication channel linking the command interpreter and the control instrument independent of the interface bus standard type and interface hardware driver type. The method also includes providing a common communication interface between the user and the control instrument.

One or more of the following features may also be included. A user may establish a second communication channel linking the command interpreter to a second control instrument. The method may further include having a first and a second communication interface. The interfaces associated with the first and second communication channels may be of different types. The different types of communication interfaces include any of the supported interface types such as Serial, General Purpose Interface Bus (GPIB), Virtual Machine Environment Extended for Instrumentation (VXI), or General Purpose Interface Bus-Virtual Machine Environment Extended for Instrumentation (GPIB-VXI).

The communication interface type of at least one communication channel is the Virtual Instrument Software Architecture (VISA) protocol.

The method further includes selecting the first control instrument having a particular type of communication interface from a group of instrument interfaces having a first driver that includes the first type of communication interface and selecting the second control instrument from a group of instrument interfaces having a second driver that includes the second type of communication interface.

The user may establish the first communication channel with the first control instrument using a first instantiation command based on a first syntax. Similarly, the second communication channel can also be established using a second instantiation based on the same first syntax.

In response to an interpreter command, the method may further include creating a first and a second instrument object, having properties, associated with the first and the second communication channel, respectively. The first instrument object may have a read function for receiving data from the first communication channel, as well as a write function for transmitting data through the first communication channel in response to the command interpreter.

The user may also create an object array in response to an array creation command. The object array includes as elements, a first and a second instrument object. The user may change the properties of the first and second communication channels by changing properties of the object array.

Prior to establishing a communication channel, the method may also include detecting an available interface on a detected interface for the first communication channel and displaying the configuration of the first communication channel in response to the command interpreter to display the properties of the first instrument object.

In certain embodiments, the common interface includes a command interpreter having an instrument engine operating in an array-based environment. The routine may also generate timer events and event handling operations. Additionally, the routine may further provide for restoring objects to the array-based environment; buffering data between the interface hardware and the user interface; creating record files for data transfer; validating parameters; byte swapping, and configuring object properties, among others.

As yet another feature, the method may establish the first communication channel by linking a compilation means to the first control instrument. The compilation means compiles a user program to a stand-alone executable file when the command for compilation is received.

According to another aspect of the invention, a system includes a user interface adapted to receive a first creation command, a command interpreter, a first control instrument, and a first communication channel linking the command interpreter and the first control instrument. The system further includes a common communication interface for communicating with the first instrument.

One or more of the following features may also be included. The system may include a second control instrument and a second communication channel.

The user may establish the first and the second communication channels in the system using various supported types of communication interfaces, such as Serial, General Purpose Interface Bus (GPIB), Virtual Machine Environment eXtended for Instrumentation (VXI), or GPIB-VXI.

The first and second communication channels may also conform to different communication protocols. The system may include control instruments having an interface selected from a group of instrument interfaces supplied by different types of drivers.

The first and second communication channels may be established in response to first and second instantiation commands, respectively, according to a first syntax.

The system may further include first and second configuration commands according to a second syntax for changing the configuration between each of the communication channels with their corresponding control instruments.

The system may further include first and second instrument objects associated with the first and second communication channels. The system may also include an object array having as elements, the first and second instrument objects. The user may change the properties of the communication channels in response to the interpreter command to change properties of the object array.

The first instrument object may include a read function for receiving data and a write function for transmitting data through the communication channel in response to the interpreter command.

Prior to establishing a communication channel, the system may also include means for detecting an available interface on a detected interface for the first communication channel and means for displaying the configuration of the first communication channel in response to the interpreter command to display the properties of the first instrument object.

According to another aspect of the invention, a system for communicating with control instruments includes means for receiving a creation command from a user, means for establishing a communication channel, means for providing a common communication interface for communicating with control instruments, and means for creating an object array having properties, including a first and a second instrument object as elements of the object array.

According to yet another aspect of the invention, a method includes instantiating an instrument object, establishing a communication channel linking the control instrument to the instrument object, writing and reading data between the control instrument and the instrument object, and disconnecting the instrument object from the control instrument in response to a close function call.

Embodiments may have one or more of the following advantages.

The system allows a user to simplify communication with control instruments independent of the various types of interface bus standards, communication protocols, or types of interface hardware.

Using only one common communication interface allows users to easily set up, configure, and change the properties of communication channels linked to various control instruments. In this manner, the system is a powerful, concise mechanism that allows users to easily and quickly communicate with control instruments without laboriously learning the details of different hardware interfaces having a distinct Application Program Interface (API) or driver modules. The common communication interface operates across different drivers, different hardware protocols, and different hardware bus standards.

Furthermore, the instrument object arrays provide a powerful programming tool for users to interact with the control instruments, by allowing access to complex operations without laborious user programming. A user can easily gain access to properties and data from various types of instruments using only one object array which is a vector of objects. Thus, the user can easily configure an object's properties, manipulate it, and control the behavior of the control instruments.

Moreover, the user communicates to objects of different types by using greatly simplified functions to perform complex programming operations. Therefore, the user is required to have neither extensive nor detailed knowledge of hardware to benefit from using object array features in communicating with various control instruments.

The details of one or more embodiments of the invention are set forth in the accompanying drawings and the description below.

DETAILED DESCRIPTION

Figure 1:
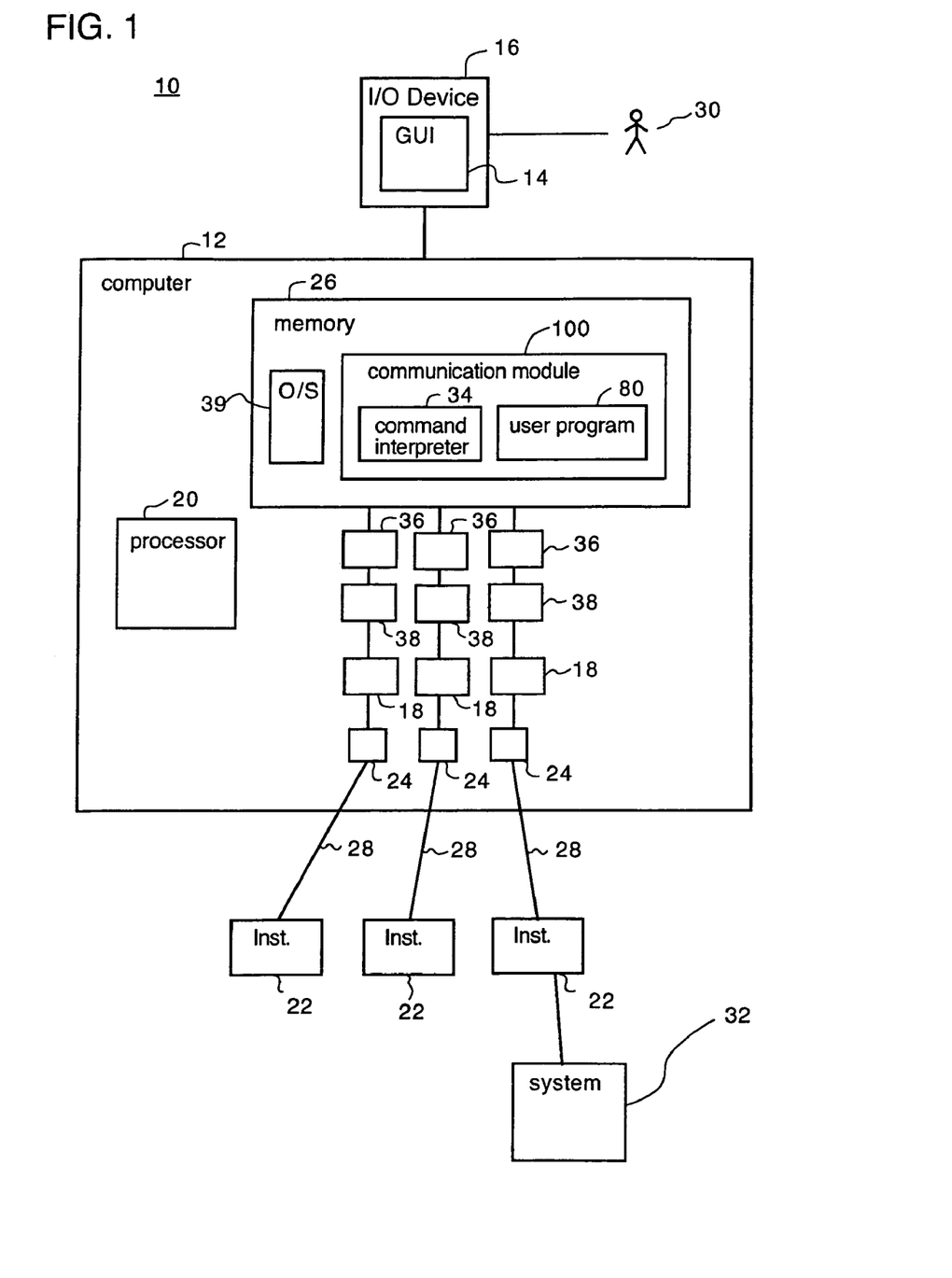
FIG. 1 is a communication system.

FIG. 1 shows a communication system 10. The communication system 10 includes a computer 12 having an input/output (I/O) device 16 for display of a graphical user interface (GUI) 14 to a user 30. The GUI 14 includes a user command line interface. The GUI 14 allows a user 30 to interact with various user programs residing in computer 12. For example, the GUI 14 displays information regarding the configuration of the various communication channels the user 30 may establish in response to user commands.

Computer 12 further includes a processor 20 for executing the user 30's commands entered by the user 30. Computer 12 includes an interface hardware 18, which is typically a separate circuit board that allows the computer 12 to use certain kinds of peripheral devices, such as, each of control instruments 22. Each interface hardware 18 is associated with different types of interface bus standard types, such as Serial, General Purpose Interface Bus (GPIB), Virtual Machine Environment eXtensions for Instrumentation (VXI), or General Purpose Interface Bus-Virtual Machine Environment Extended for Instrumentation (GPIB-VXI). Various supported interface bus standards may be used and are not limited to those shown by exemplification in the embodiments herein. For example, supported bus standard interfaces include, TCP/IP (Transmission Control Protocol/Internet Protocol), UDP (User Datagram Protocol), VISA-TCP/IP, USB (Universal Serial Bus), USB+, USB 2.0, IrDA standard (InfraRed Data Association), FireWire, PXI (PCI Extensions for Instrumentation), VXI, Parallel Port, and Centronics parallel interface.

Interface hardware 18 includes a corresponding software driver 38 having a distinct Application Programming Interface (API) to link the control instruments 22 to the computer 12.

Interface hardware 18 contains one or more ports 24 to link peripheral instruments such as control instruments 22 to computer 12. For example, three physical ports 24 are shown in association with interface hardware 18. In turn, ports 24 connect to control instruments 22. For example, one port 24 individually connects through a physical connection 28, such as cable or wire, to one of the corresponding control instruments 22. One of the control instruments 22 may be further connected to a system 32 under test. System 32 may include systems under control, test and measurement equipment such as analyzers, test systems, calibrators, data acquisition systems, counter/timers, meters, oscilloscopes, DMMs, generators, power supplies, scanners and switches, and sources. Thus, system 32 relates to any system having data transfer capabilities.

User 30 may send a list of requests or commands to processor 20 from the GUI 14 to establish a communication channel between the computer 12 and the control instruments 22. The user 30 does so by writing a user program 80, which resides in memory 26 of computer 12. The user program 80 may be associated with the syntax of, for example, any interpreted programming environment. An interpreted programming environment may be any proprietary program that performs mathematical computations for modeling, simulation, graphics, or data analysis related to control instruments, among many others. An example of an interpreted programming environment is MATLAB® from MathWorks, Inc., of Natick, Mass.

An interpreted programming environment includes a program referred to as a "command interpreter" 34 that executes other programs. In contrast with a compiler that translates source code into machine code and stores the machine code output in a file for later execution, the command interpreter 34 analyzes statements in the user program 80 each time it is executed and then performs the desired action. Thus, the command interpreter 34 processes the user program 80, analyzes the meaning of each statement of the user program 80, and sends the corresponding desired action to the common interface adaptor 36.

The user program 80, coupled with the command interpreter 34, is shown as a communication module 100. The communication module 100 may also include, in lieu of a command interpreter 34, a compiler (not shown) for generating a stand-alone executable file. The compiler is used as an intermediate step in the translation of the user program code to an non-interpreted language. In other words, the user 30 would generate a program in a programmatic environment and then compile the program through the compiler. This would in turn result in a stand-alone executable file that may be run independently from the user program 80. In other embodiments, the user program may be otherwise modified for execution in other operating environments.

A common interface adaptor 36 is an interface for communicating with various drivers 38 having distinct APIs, which in turn communicate with the different types of interface hardware 18. In particular, the common interface adaptor 36 connects the command interpreter 34 to a driver 38, causing the transfer of data and functions between the interpreter 34 and the driver 38. Driver 38 includes a software program that extends an operating system 39 to support a peripheral device such as interface hardware 18 of control instrument 22.

Driver 38 interfaces with Serial port interface standards such as RS-232 which are widely used in Windows (from Microsoft® Corporation), SUN (from Sun® Microsystems, Inc.), and MAC (from Apple Computer, Inc.) Operating Systems.

Driver 38 is also compatible with General Purpose Interface Bus (GPIB), known as IEEE 488.1, a standard hardware interface connection commonly used in the test and measurement industry. The GPIB interface hardware provides a corresponding software driver specific to the particular GPIB interface hardware used by a control instrument 22.

Furthermore, driver 38 may be a VISA driver. A VISA driver may be used with different interface bus standard types. One difference between VISA drivers and other types of drivers such as a GPIB driver is that a VISA driver allows the interface hardware 18 to communicate using a common VISA API.

Driver 38 can support peripheral devices such as interface hardware 18 of any control instruments 22, ultimately linking the user 30 to system 32 under test through the communication module 100, the common interface adaptor 36, and one of the control instruments 22. Driver 38 may support various types of communication interfaces, as described above.

Figure 2:
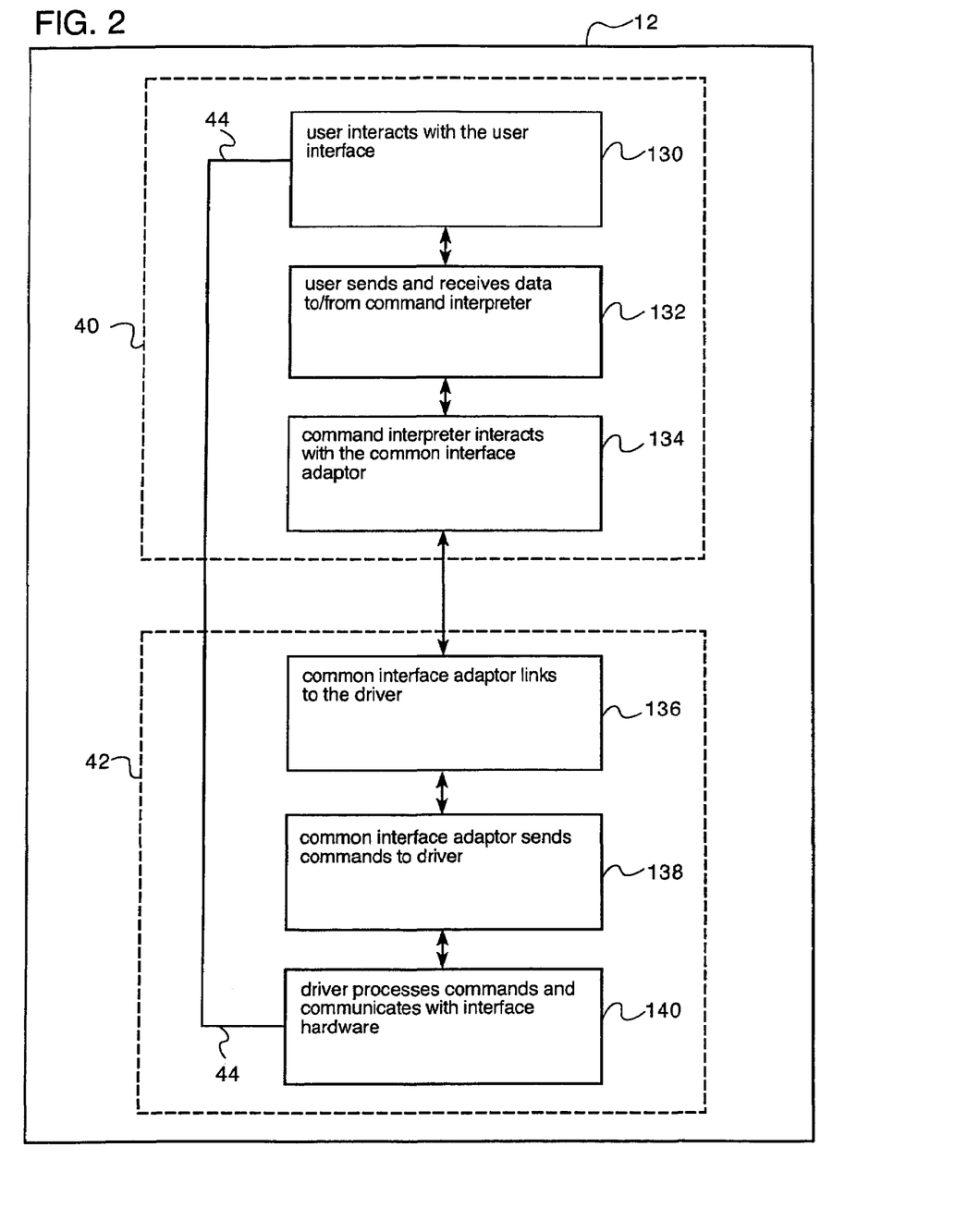
FIG. 2 shows a flowchart illustrating the processes of the communication system of FIG. 1.

Referring now to FIG. 2, two processes associated with the communication system 10 are illustrated. In order for the user 30 to communicate with control instruments 22, the communication system 10 executes a programming process 40 and an operating process 42. The programming process 40 is distinct from the operating process 42, both residing within computer 12 of FIG. 1.

In the programming process 40, the user 30 interacts (130) with the GUI 14, which in turn sends and receives (132) data from the command interpreter 34. The command interpreter 34 interacts (134) with the common interface adaptor 36. In short, the user 30's requests to the command interpreter 34 and the command interpreter 34's interaction with the common interface adaptor 36 describe the programming process 40.

In the operating process 42, the common interface adaptor 36 of the programming process 40 links (136) to driver 38, which in turn interfaces (138) the interface hardware 18 to the common interface adaptor 36. The common interface adaptor 36 sends the translated user 30 commands sent by the command interpreter 34 to the driver 38. Driver 38 processes (140) the commands and operates the interface hardware 18. The driver 38 also communicates with the interface hardware 18 transferring data from the interface hardware 18 to the common interface adaptor 36. Accordingly, the operating process 42 causes the common interface adaptor 36 to be linked to one of the control instruments 22.

FIG. 2 illustrates how a programming process 40 coupled with the operating process 42 allow the user 30 to directly communicate with one of the control instruments 22, as shown by link 44.

To better understand the invention, it is helpful to clarify the general meanings of certain terms used in connection with the object-oriented systems and features described hereinafter. An example object-oriented language is JAVA™ from Sun® Microsystems, Inc. The JAVA programming paradigm environment is a platform-independent abstracted computing model that permits one to create executable program code that is capable of running on a variety of operating systems.

An "object class" is a set of data (attributes) and functional capabilities (routines) encapsulated into a single logical function.

An "object instance" is an embodiment (instantiation) of an object class.

An "object" refers to an instance of an object class. Different objects may be differentiated from other instances of the same object class by their attribute values, such as the object properties and its data members, and not by their routines (capabilities). The term "object" is often used by itself to refer loosely to either an object class or an object instance, the difference being understood in context.

"Attributes" or "properties" are data elements of object classes that are expressed through particular values in object instances.

A "routine" is a functional capability associated with an object class.

"Inheritance" represents a specialization of an object class in which the specialized class shares all of the attributes and routines of the parent classes.

Here, an "instrument object" refers to an object that provides a gateway to the instrument's capabilities and allows the user 30 to control the behavior of the control instrument, 22.

The instrument object also refers to an instance of a particular object class, such as GPIB, Serial, and VISA. In particular, an instrument object includes functions that are inherited by the Serial, GPIB, and VISA objects. A serial object contains functions that are unique to communicating with a serial port instrument. Similarly, a GPIB object includes functions that are unique to communicating with a GPIB-capable instrument, and a VISA object has functions that are unique to communicating with instruments using the VISA standard or protocol. An instrument object has functions common across all of these different instrument objects.

Figure 3:
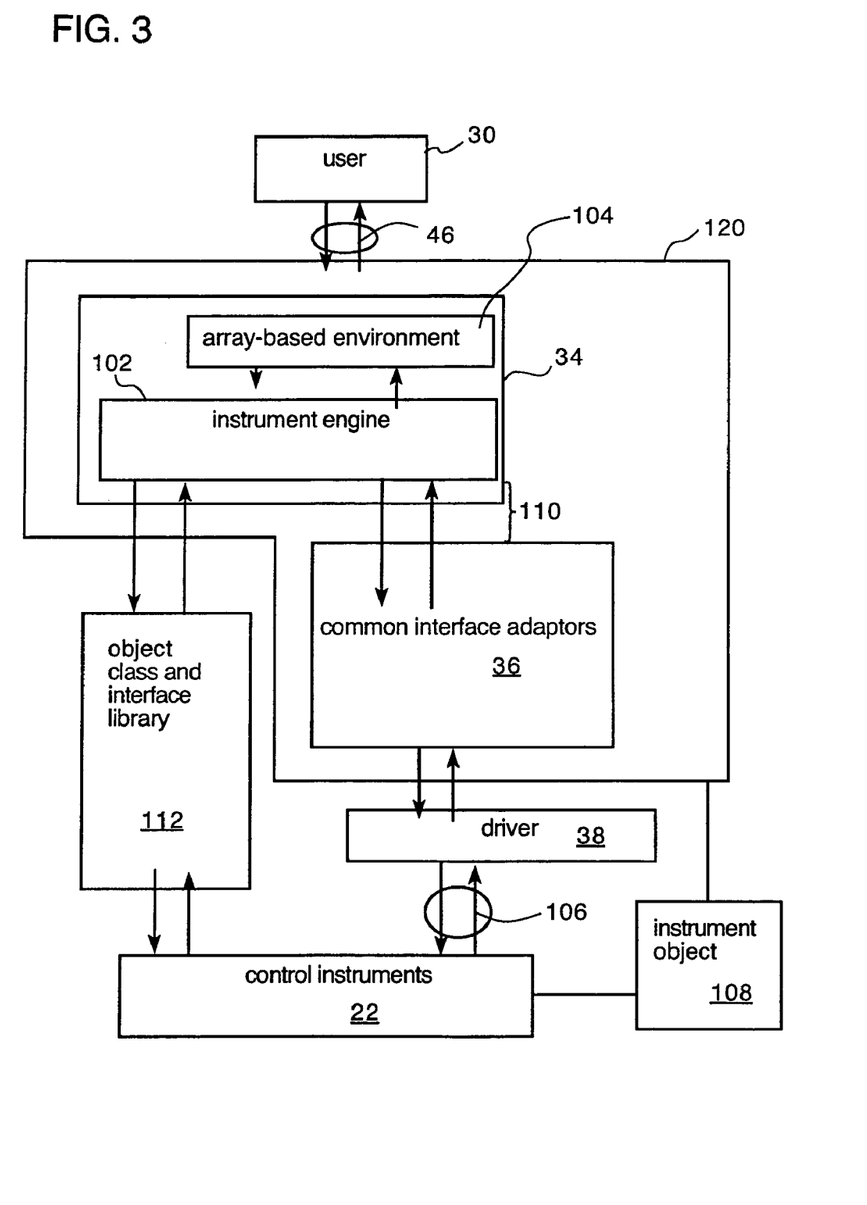
FIG. 3 shows a common communication interface of the communication system of FIG. 1.

An instrument object may be associated with any communication channel established between a command interpreter and a control instrument. Referring to FIG. 3, the user 30 may generate an instrument object 108 in response to instantiation commands, also referred to as an "interpreter command."

To accomplish interface hardware driver type and interface bus standard independence, the user 30 generates an instrument object 108, associated with a particular communication channel 44, linking the command interpreter 34 to the control instruments 22. The user 30 generates a creation command at the GUI 14 to generate the instrument object.

The command interpreter 34 processes and forwards the creation command to the appropriate type of common interface adaptor 36 selected based on the input arguments specified in the creation command. One task of the common interface adaptor 36 is to translate the information passed between the command interpreter 34 and the driver 38 associated with the instrument object. Thus, the common interface adaptor 36 allows a programming environment to be wholly independent of the type of interface hardware driver and interface bus standard.

The operation of two types of common interface adaptors, GPIB and VISA, are further described next.

The GPIB common interface adaptor communicates with the GPIB interface hardware. Generally, each GPIB card which has a unique API, requires a common interface adaptor 36. Since each unique driver adopts its own syntax for communicating with a GPIB interface hardware, a common interface adaptor is added to translate the functions passed between the command interpreter 34 and the corresponding driver 38. Although the adaptor is written using the 'C' programming language, any suitable programming language may be used.

For example, a National Instruments® (hereinafter "NI") driver may have a command called ibwrt for writing ASCII data to NI interface hardware. An Agilent Technologies® (hereinafter "Agilent") driver has a similar command called hpibwrt that writes ASCII data to Agilent interface hardware. However, the command interpreter 34 uses a writeHardwareAscii function to write ASCII data to the interface hardware. The NI common interface adaptor translates the writeHardwareAscii function to ibwrt. The Agilent common interface adaptor translates the writeHardwareAscii function to hpibwrt.

Similarly, the VISA protocol requires its own common interface adaptor. In order to communicate with a control instrument 22 using the VISA standard, the command interpreter 34 relies on the particular corresponding type of VISA software driver. The VISA software driver uses the appropriate commands for communicating with different control instruments 22. Similar to a GPIB common interface adaptor, a VISA common interface adaptor translates the commands and requests sent from the command interpreter 34 to the corresponding VISA driver.

Referring again to FIG. 3, the command interpreter 34, a Java™ Native Interface layer (hereinafter "JNI layer") 110 developed by Sun Microsystems®, Inc., and the common interface adaptor 36, implement the common communication interface 120. Furthermore, an array-based environment 104 and an instrument engine 102 are also shown.

We now describe each of the components of the common communication interface 120.

The array-based environment 104 includes functions used by the user 30 to create an instrument object 108 through function calls 46, as well as to configure an instrument object's properties and to connect the instrument object with one of the control instruments 22.

The instrument engine 102 is responsible for passing data and information from the user 30 to the driver 38 and back using function calls 46 defined in the array-based environment 104. The instrument engine 102 takes the data either from the user 30 or from the driver 38 and formats it into the format that the driver 38 or the user 30 requested. How the data is sent and read to and from the driver 38 depends upon the type of the driver 38. The user 30 defines the driver type when the user 30 creates an instrument object. To this end, the common interface adaptor 36 makes the communication between the instrument engine 102 and the driver 38 possible.

In certain embodiments, the instrument engine 102 is written in the JAVA programming language, whereas the common interface adaptor 36 is written in the 'C' programming language. When the instrument engine 102 communicates with the common interface adaptor 36, the JNI layer 110 enables this communication.

The JNI layer 110 is a standard programming interface for writing JAVA native functions and embedding the Java virtual machine into native applications. The primary goal of the JNI layer 110 is binary compatibility of native process libraries across all Java virtual machine implementations on a given platform. By writing programs using the JNI layer 110, Java code can operate with applications and libraries written in other languages, such as 'C'.

For example, the JNI layer 110 can transfer data between the Java and the 'C' programming layers. In particular, the JNI layer 110 is used because the instrument engine 102 is written in JAVA whereas the common interface adaptor 36 is written in the 'C' programming language. With other programming languages, different programming interfaces may be used.

When establishing a communication channel with a serial type interface hardware, the instrument engine 102 is not required to connect to a common interface adaptor. Rather, the connection between the instrument engine 102 and the serial interface is handled by an object class and interface library 112, such as a JAVA package.

Where the JAVA programming language is used, JAVA interfaces and classes are grouped into a JAVA package. In certain embodiments, by using a JAVA package, the user 30 can easily access ready-made interfaces, classes, fields, constructors, and functions. Therefore, the instrument engine 102 may use the functions provided in such packages to communicate with a control instrument connected to a serial port. Thus, the object class and interface library 112 may be replaced by any suitable programming package or library.

Figure 4:
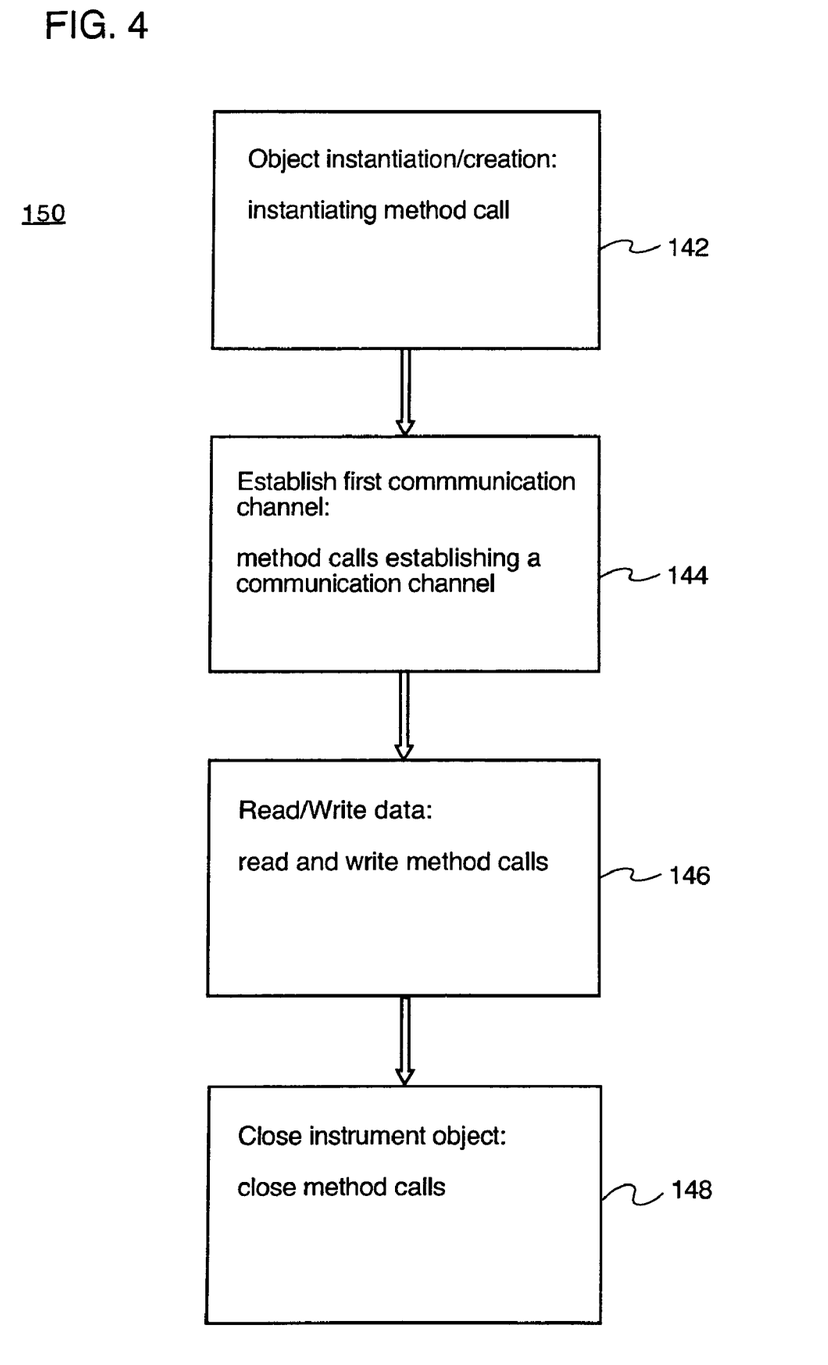
FIG. 4 shows a flowchart illustrating an instrument control session.

For non-serial types of interfaces, the following example illustrates how the user 30 may send commands and data between the array-based environment 104 and the instrument engine 102 and back. Referring to FIG. 4, the commands described in this example demonstrate a process 150, also referred to as an "instrument session" which the user 30 initiates. This example shows a typical session that a user may initiate.

First, user 30 may generate a GPIB object that uses a NI driver 38 by instantiating (142) an instrument object, in this case, a GPIB object, using the following instantiating function call:

g=gpib('ni', 0, 1);

The array-based environment 104's GPIB constructor calls the instrument engine 102 GPIB constructor. The instrument engine constructor verifies that a NI GPIB common interface adaptor 36 exists (first argument). The instrument engine constructor also configures the instrument object 108's properties to correspond to the constructor arguments, i.e., BoardIndex=0 and PrimaryAddress=1 (second and third arguments, respectively). Thus, prior to establishing a first communication channel with the control instrument, the user 30 detects an available interface for establishing the communication by the appropriate instantiation functions.

The instrument session includes establishing (144) a first communication channel linking the instrument object, or alternatively, the first instrument object, to the control instrument. The function call is:

fopen (g)

The array-based environment 104's fopen function calls the instrument engine 102's fopen function, which in turn, invokes the NI common interface adaptor 36's create function. The NI common interface adaptor 36's create function communicates directly with the driver 38 made by NI, which communicates with the GPIB interface hardware (not shown) and establishes the 106 connection with one of the control instruments 22.

The user 30 may control the behavior of the control instruments by writing and reading (146) information through the following read and write function calls:

fprintf(g, '*IDN?');
[data, count, msg]=fscanf(g);

The array-based environment 104's fprintf function passes the string *IDN? to the instrument engine 102's fprintf function. The instrument engine 102 takes the string '*IDN?' and passes it to the NI common interface adaptor 36's write function as an argument. This function writes the string to the instrument 22 through the NI GPIB driver 38.

The array-based environment 104's fscanf function notifies the instrument engine 102 that data should be available from the instrument 22. The instrument engine 102 calls the NI common interface adaptor 36's read function that queries the driver 38 for any available data, which in turn queries the instrument 22. If data is available, the data is returned to the instrument engine 102, which then returns the data to the user 30. If no data is available, an error code is passed back to the instrument engine 102. The function of the instrument engine 102 invokes the NI common interface adaptor 36 to translate and pass the error message to the user 30.

Finally, the user 30 may close the instrument session by disconnecting (148) the instrument object 108 from one of the control instruments 22 with the fclose(g) function call.

The instantiation of the different types of instrument objects, as well as a comprehensive list of their properties and functions can be found in the *Instrument Control Toolbox User's Guide* (Version 1, Release 12), Copyright 2000 by The MathWorks, Inc., which is incorporated herein by reference.

The above example illustrates an instrument session describing read and write commands.

However, the user 30 may perform or require the execution of more complex operations, such as implementing timer events, event handling, restoring the object to the array based environment, log data to disk, parameter validation, data type casting, buffering of data, byte swapping, property configuration, and translation of error codes.

For instance, the instrument engine 102 includes routines for generating timer events and event handling. Implementing timer events involves using events and callbacks. For example, while the instrument object 108 is connected to an instrument 22, events can be used to display a message, display and analyze data, or perform any other callback. Therefore, an instrument session also supports event-based acquisition that allows callbacks to be generated into the array-based environment 104 when a specified event occurs. To this end, each instrument object 108 includes a set of callback properties. When an event is generated, the callback associated with the event is executed. For example, in a MATLAB® environment, the GPIB timer event type has TimerAction and TimerPeriod as its associated callback properties. Accordingly, a timer event is generated when the time specified by the TimerPeriod property passes. Time is measured relative to when the object is connected to the instrument 22.

The instrument engine 102 also includes routines for restoring the object to the array-based environment 104. Object storage and retrieval allows serial port, GPIB, or VISA objects, for example, to be saved and reloaded to and from a memory location such as memory 26. This allows an instrument object 108 to be recreated in the array-based environment 104 from a previous user session in the array-based environment 104. When saving an instrument object 108, any data that may be in the instrument object's input or output buffer is not saved. Data in the object's input buffer can be read into the array-based environment 104 and saved separately. Upon loading, the value of any read-only property is restored to default values.

The instrument engine 102 also provides routines for finding an instrument object 108 which has been created but whose handle or reference has been lost. When an instrument object 108 is created, the object is stored in the instrument engine 102. The user 30 can create as many references or handles as desired to this object. If the user loses the reference to the instrument object 108, the instrument engine 102 routines are able to restore the instrument object 108 from the instrument engine 102 back to the array-based environment. The user 30 has the ability to restore all instrument objects in this manner from the instrument engine 102 or the user 30 can specify a set of properties and property values that the instrument object 108 to be restored must have.

Routines are also provided for buffering data to be sent to the interface hardware 18 and buffering data read from the interface hardware 18. Buffering data to be sent to the interface hardware is performed using an output buffer. An output buffer is computer memory allocated by the instrument object 108 to store data that is to be written to the instrument 22. The flow of data from the user to the instrument 22 proceeds as follows: (1) the data specified by a write function is sent to the output buffer; and, (2) the data in the output buffer is sent to the instrument 22. In some embodiments, one property specifies the maximum number of bytes that you can store in the output buffer. Another property indicates the number of bytes currently in the output buffer.

On the other hand, an input buffer includes memory allocated by the instrument object to store data that is to be read from the instrument 22. In this case, the flow of data from the instrument 22 to the user would follow these steps: (1) data read from the instrument is stored in the input buffer; and, (2) the data in the input buffer is returned to the variable specified by the read function. Data from consecutive reads are automatically appended in the input buffer.

The instrument engine 102 further provides routines for creating a record file. The record file is an ASCII file that contains a record of one or more instrument control sessions. Data transferred between the array-based environment 104 and the instrument 22 and any events that may have occurred can be saved to a text file also referred to as a record file. A compact and detailed record file may be created. A compact record file contains a description of the data that was sent between the array-based environment 104 and the instrument 22, a description of the events which occurred, the number of values written to the instrument, the number of values read from the instrument, the data type of the values, and event information A detailed record file contains the same information as the compact record file along with the actual data that was transferred between the array-based environment 104 and the instrument 22.

ASCII data sent between the array-based environment 104 and the instrument 22 is stored as text in the record file.

Binary data with precision given by uchar, schar, (u)int8, (u)int16, or (u)int32 is recorded as hexadecimal values. For instance, if the decimal value 255 is read from the instrument 22 as a 16-bit integer, the hexadecimal value 00FF is saved in the record file. Single and double precision floating-point numbers are recorded as decimal values using the % g format, and as hexadecimal values using the format specified by the IEEE Standards 754-1985 for Binary Floating-Point Arithmetic.

Moreover, recording information to disk provides a permanent record of the instrument control session and provides an easy way to debug user program 80. The instrument engine 102 provides the capability to perform the above-identified complex operations and features. In communicating with the instrument 22, these complex operations are encapsulated into simpler function calls once the user 30 has created one instrument object.

Figure 5:
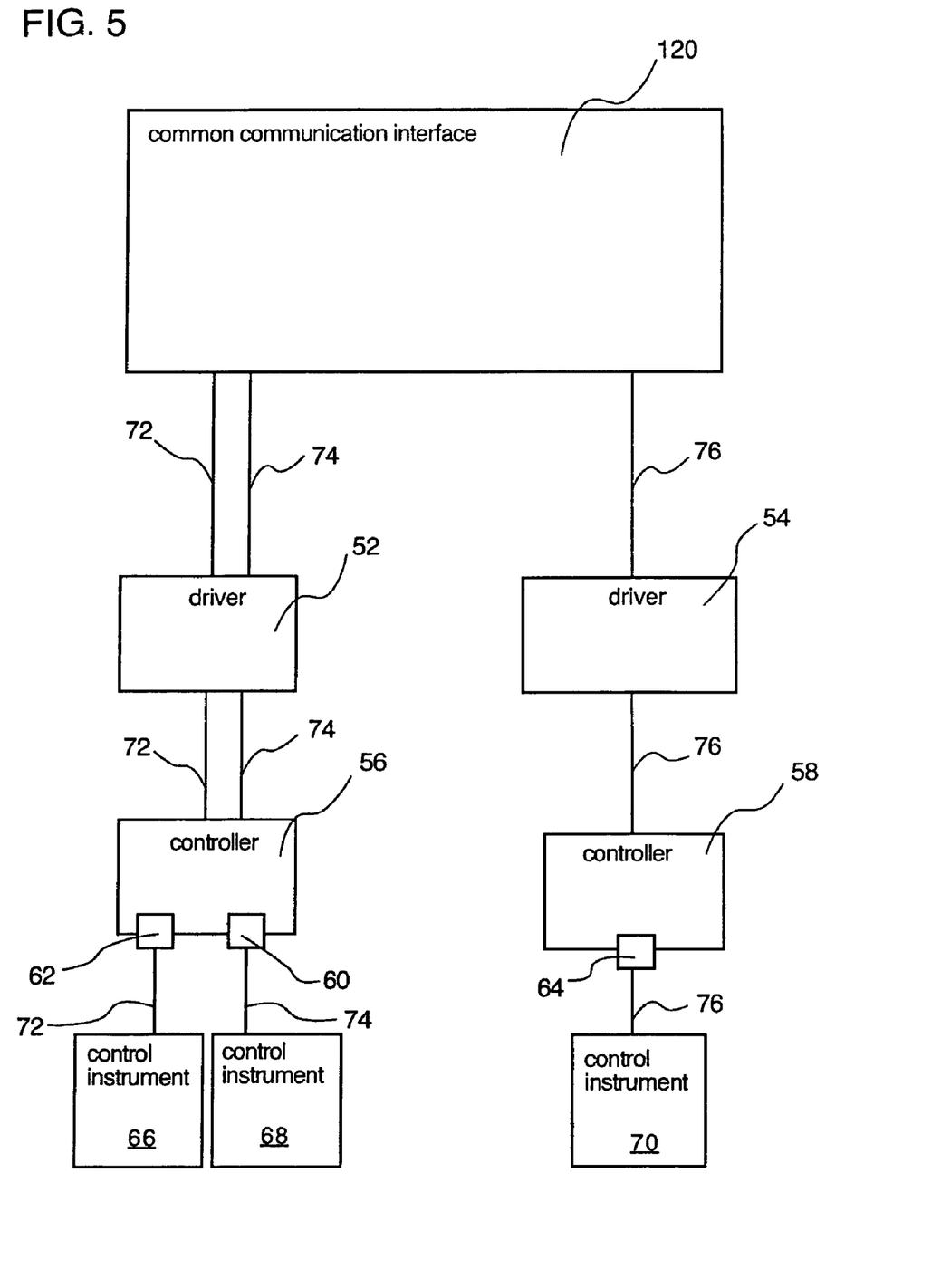
FIG. 5 shows the communication channels of the system of FIG. 1.

By way of illustration, FIG. 5 shows how the user 30 may use the common communication interface 120 of FIG. 3, by establishing two or more communication channels. The common communication interface 120 is shown in association with drivers 52 and 54.

The user 30 establishes a first communication channel 72. This is done in response to a first creation command (not shown). The first communication channel 72 links the common communication interface 120 to the first control instrument 66. Subsequently, the user 30 may open a second communication channel 74 in response to a second creation command (not shown). The second communication channel 74 links the common communication interface 120 to the second control instrument 68. The first and second communication channels may be supported simultaneously so that a user 30 has access to and can control both communication channels 72 and 74 at the same time.

Interface hardware 56 may support GPIB, VXI or Serial interfaces and different types of interface hardware may supply the driver 52 with its own unique API. Interface hardware 56 has ports 60 and 62 supporting the different types of interface buses attached to the control instruments 66 and 68.

After establishing the first communication channel 72, the user 30 may open second communication channel 74 using the same interface hardware 56. However, the user 30 is not limited to using interface hardware 56. The second communication channel 74 may be established using a different interface hardware, in this case, interface hardware 58. This communication channel is shown as communication channel 76. In this example, driver 54 and interface hardware 58 are used to connect the common communication interface 120 to the control instrument 70, via a physical port 64.

Therefore, user 30 may establish various communication channels linking the common communication interface 120, specifically, the command interpreter 34 of FIG. 1, to the control instruments 22 independent of the type of interface bus standard type and interface hardware type.

Describing the driver interchangeability feature of the common communication interface 120, a first interface driver hardware type may supply the driver 52 and interface hardware 56, whereas a second interface driver hardware type may supply the driver 54 and interface hardware 58. Moreover, the interface bus standards implemented in ports 60, 62, and 64 may be of various different types. But irrespective of the different types of interface driver hardware and the type of interface bus standard used, the communication system 10 exposes only one common communication interface 120 to the user 30. This way, communication with any and all control instruments is facilitated.

When the user 30 establishes the first communication channel 72, the user 30 does so through a particular type of communication interface 120, such as Serial, GPIB, VXI, or GPIB-VXI. Similarly, the user 30 establishes a second communication channel through a different type of communication interface. Thus, the first and the second communication interfaces may include, respectively, interfaces of a first and second type.

Furthermore, the first communication channel is consistent with a particular type of communication protocol, provided by the first interface driver hardware type. In other words, a first interface hardware 56 would provide a consistent and compatible driver 52, namely, in the form of a first communication protocol, necessary for establishing the first communication channel 72.

In the same vein, the user 30 would establish the second communication channel through a second communication protocol provided by a second interface hardware 58.

When the instrument engine 102 handles more than one communication channels, the array-based environment 104 of the common communication interface 120 is a powerful tool. The array-based environment 104 can simplify the communication with a control instrument in significant ways. Objects of different classes or of the same class may be combined into one object array. For example, the user 30 may generate an object array of only Serial port objects or an array of Serial port and GPIB objects. An object array is defined as a collection of identically typed objects, namely, an array of instrument objects, merely distinguished by their "indices" or "subscripts." For example:

X=[g v];
CopyOfG=x(1);
CopyOfV=x(2);
CopyOfX=x(1:2);

Many array-based functions allow the user 30 to operate on an array of instrument objects, i.e., fopen, fclose, and stopasync. An array of instrument objects is generated by concatenating different instrument objects, similar to creating an array of variables by concatenating the variables together. The user 30 creates an object array in response to an array creation command to the command interpreter.

An example of array creation illustrates this feature:
% creates a GPIB object, the array creation command
g=gpib('ni', 0, 1);
% creates a VISA-GPIB object
v=visa('ni', 'GPIB0::2::0::INSTR')
% create a row array
x=[g v]
% using one call, the EOSMode property of g and v can
   be configured to the same value, set (x, 'EOSMode', 'read')

No restrictions or limitations exist on the use of object arrays. In particular, the user 30 may create as many instrument objects as required or needed without limitations concerning the number of objects in an object array. Moreover, array objects may use any instrument object of any particular interface hardware having a corresponding and unique API.

Although the invention, preferably relates to instrumentation control, other fields of application especially in the broad sector of communication systems, are within the scope of the invention. Thus, a number of embodiments of the invention have been described. Accordingly, it will be understood that various modifications may be made without departing from the scope of what is presented in the following claims.

What is claimed is:

1. In an electronic device, a method for communicating with one or more control instruments, the method comprising:
   providing a common communication interface for communicating with a first control instrument via a driver for driving hardware of the first control instrument, wherein the driver is specific to the hardware of the first control instrument, wherein the common communication interface includes a command interpreter for generating a command for the first control instrument that is not recognized in the driver;
   receiving a first creation command;
   establishing a first communication channel linking the command interpreter and the first control instrument in response to the first creation command; and
   enabling the command interpreter to communicate with the first control instrument independently of an interface bus standard type and an interface hardware driver type by converting the command for the first control instrument generated from the command interpreter to a command for the first control instrument that is recognized in the driver.

2. The method of claim 1, wherein receiving the first creation command comes from a user interface.

3. The method of claim 1 further comprising:
   establishing a second communication channel linking the command interpreter and a second control instrument in response to a second creation command from the user interface.

4. The method of claim 3, wherein the first communication channel is established through a first communication interface of the first control instrument and the second communication channel is established through a second communication interface of the second control instrument, the first communication interface being of a first type and the second communication interface being of a second type.

5. The method of claim 4, wherein the first communication interface type and the second communication interface type include any of the supported interface types.

6. The method of claim 5, wherein at least one of the first and second communication interface type is Virtual Instrumentation Software Architecture (VISA).

7. The method of claim 4, wherein:
   the first control instrument having a communication interface is selected from a group of instrument interfaces having a first driver that includes the first type of communication interface; and
   the second control instrument having a communication interface is selected from a group of instrument interfaces having a second driver that includes the second type of communication interface.

8. The method of claim 3 further comprising:
   establishing the first communication channel with the first control instrument in response to a first instantiation command according to a first syntax; and
   establishing the second communication channel with the second control instrument in response to a second instantiation command according to the first syntax.

9. The method of claim 3 further comprising:
   creating a first instrument object associated with the first communication channel in response to an interpreter command, wherein the first instrument object has properties;
   creating a second instrument object associated with the second communication channel in response to the interpreter command, wherein the second instrument object has properties;
   creating an object array including the first instrument object and the second instrument object as elements of the object array in response to an array creation command to the
   command interpreter, wherein the object array comprises properties; and
   changing the properties of the first communication channel and the second communication channel in response to the interpreter command to change the properties of the object array.

10. The method of claim 9 further comprising:
    changing the configuration of the first communication channel in response to the interpreter command to change the properties of the first instrument object; and
    changing the configuration of the second communication channel in response to the interpreter command to change the properties of the second instrument object.

11. The method of claim 9, wherein the first instrument object has a read function, the function further comprising:
    receiving data from the first communication channel in response to the interpreter command to execute the read function of the first instrument object.

12. The method of claim 9, wherein the first instrument object has a write function, the function further comprising:
    transmitting data through the first communication channel in response to the interpreter command to execute the write function of the first instrument object.

13. The method of claim 9 further comprising:
    displaying the configuration of the first communication channel in response to the interpreter command to display the properties of the first instrument object.

14. The method of claim 1 further comprising:
    detecting an available interface for the first communication channel with the first control instrument, wherein the first communication channel is established on a detected interface.

15. The method of claim 1, wherein the common communication interface includes a command interpreter having an instrument engine operating in an array-based environment.

16. The method of claim 15 further comprising generating timer events and event handling operations.

17. The method of claim 15 further comprising restoring an object to the array-based environment.

18. The method of claim 15 further comprising buffering data between interface hardware and an user interface.

19. The method of claim 15 further comprising creating record files for data transfer.

20. The method of claim 15 further comprising validating parameters.

21. The method of claim 15 further comprising byte swapping.

22. The method of claim 15 further comprising configuring object properties.

23. The method of claim 15 further comprising translating error codes.

24. The method of claim 15 further comprising data type casting.

25. A method of claim 1, wherein the first communication channel is established by linking a compilation means and the first control instrument in response to the first creation command independent of an interface bus standard type and an interface hardware driver type.

26. The method of claim 25, wherein the compilation means compiles a user created program to a stand-alone executable file when a command for compiling the program is received.

27. A system for communicating with one or more control instruments, the communication system comprising:
  a user interface adapted to receive a first creation command;
  a common communication interface for communicating with a first control instrument via a driver for driving hardware of the first control instrument, wherein the driver is specific to the hardware of the first control instrument, wherein the common communication interface includes,
    a command interpreter adapted to receive the first creation command and generate a command for the first control instrument that is not recognized in the driver, and
    an adaptor for converting the command for the first control instrument generated from the command interpreter to a command for the first control instrument that is recognized in the driver; and
  a first communication channel linking the command interpreter and the first control instrument.

28. The system of claim 27, further comprising:
  a second control instrument; and
  a second communication channel linking the command interpreter and the second control instrument.

29. The system of claim 28, wherein the first communication channel is established through a first communication interface of the first control instrument and the second communication channel is established through a second communication interface of the second control instrument, the first communication interface being of a first type and the second communication interface being of a second type.

30. The system of claim 29, wherein the first communication interface type and the second communication interface type include any of the supported interface types.

31. The system of claim 30, wherein at least one of the first and second communication protocols is Virtual Instrumentation Software Architecture (VISA).

32. The system of claim 28, wherein:
  the first control instrument having a communication interface is selected from a group of instrument interfaces supplied by a first driver that includes the first type of communication interface; and
  the second control instrument having a communication interface is selected from a group of instrument interfaces supplied by a second driver that includes the second type of communication interface.

33. The system of claim 32, wherein:
  the first communication channel is established with the first control instrument in response to a first instantiation command according to a first syntax; and
  the second communication channel is established with the second control instrument in response to a second instantiation command according to the first syntax.

34. The system of claim 28, further comprising:
  a first configuration command according to a second syntax, for changing a configuration of the first communication channel with the first control instrument in response to the first configuration command; and
  a second configuration command according to a second syntax, for changing a configuration of the second communication channel with the second control instrument in response to the second configuration command.

35. The system of claim 28, further comprising:
  a first instrument object associated with the first communication channel in response to an instrument command;
  a second instrument object associated with the second communication channel in response to the instrument command;
  an object array including the first instrument object and the second instrument object as elements of the object array in response to an array creation command to the command interpreter; and
  means for changing the properties of the first communication channel and the second communication channel in response to the interpreter command to change a property of the object array.

36. The system of claim 28, further comprising:
  a first instrument object associated with the first communication channel, wherein the first instrument object has properties; and
  means for changing the configuration of the first communication channel in response to an interpreter command to change the properties of the first instrument object.

37. The system of claim 36, wherein the first instrument object has a read function to receive data from the first communication channel in response to the interpreter command to execute the read function of the first instrument object.

38. The system of claim 37, further comprising:
  means for displaying the configuration of the first communication channel in response to the interpreter command to display the properties of the first instrument object.

39. The system of claim 36, wherein the first instrument object has a write function to transmit data through the first communication channel in response to the interpreter command to execute the write function of the first instrument object.

40. The system of claim 27, further comprising:
  means for detecting an available interface for the first communication channel with the first control instrument, wherein the first communication channel is established on a detected interface.

41. The system of claim 27 further comprising an instrument engine operating in an array-based environment.

42. The system of claim 41, wherein the instrument engine is adapted to generate timer events and event handling operations.

43. The system of claim 41, wherein the instrument engine is adapted to restore an object to the array-based environment.

44. The system of claim 41, wherein the instrument engine is adapted to buffer data between interface hardware and the user interface.

45. The system of claim 41, wherein the instrument engine is adapted to create record files for data transfer.

46. The system of claim 41, wherein the instrument engine is adapted to validate parameters.

47. The system of claim 41, wherein the instrument engine is adapted to perform byte swapping operations.

48. The system of claim 41, wherein the instrument engine adapted to configure object properties.

49. The system of claim 41, wherein the instrument engine is adapted to translate error codes.

50. The system of claim 41, wherein the instrument engine is adapted to perform data type casting operations.

51. The system of claim 27, wherein the first communication channel is established by linking a compilation means and the first control instrument in response to the first creation command independent of an interface bus standard type and an interface hardware driver type.

52. The system of claim 51, wherein the compilation means compiles a user created program to a stand-alone executable file when a command for compiling the program is received.

53. A system for communicating with a control instrument, comprising:
   means for receiving a creation command from a user interface;
   means for establishing a communication channel linking a command interpreter and the control instrument in response to the creation command, wherein the command interpreter generates a first command for communicating with the control instrument that is not specific to the control instrument;
   means for creating an object array including a first instrument object and a second instrument object as elements of the object array in response to an array creation command to the command interpreter, wherein the object array comprises properties; and
   means for converting the first command into a second command for communicating with the control instrument using the object array, wherein the second command is specific to the control instrument.

54. A computer program product, tangibly stored in a computer readable medium comprising instructions operable by a command interpreter in response to commands to the interpreter, the instructions causing the command interpreter to:
   providing a common communication interface for communicating with a first control instrument via a driver for driving hardware of the first control instrument, wherein the driver is specific to the hardware of the first control instrument, wherein the common communication interface includes a command interpreter for generating a command for the first control instrument that is not recognized in the driver;
   receive a first creation command from a user interface;
   establish a first communication channel linking the command interpreter and a first control instrument in response to the first creation command; and
   enabling the command interpreter to communicate with the first control independently of an interface bus standard type and an interface hardware driver type by converting the command for the first control instrument generated from the command interpreter to a command for the first control instrument that is recognized in the driver.

\* \* \* \* \*